Oct. 21, 1941.  A. W. PRANCE  2,260,124
ASSIST CORD ASSEMBLY
Filed May 16, 1938
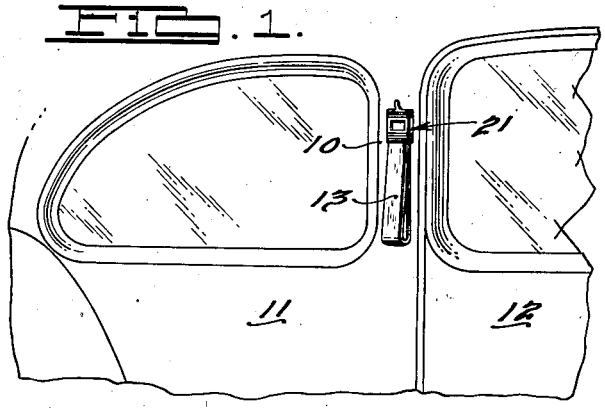
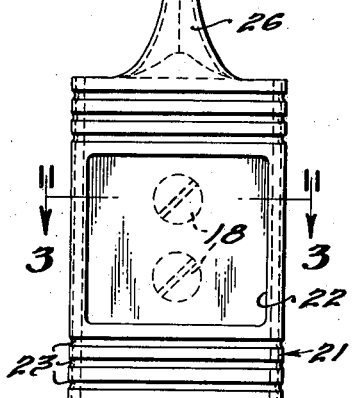
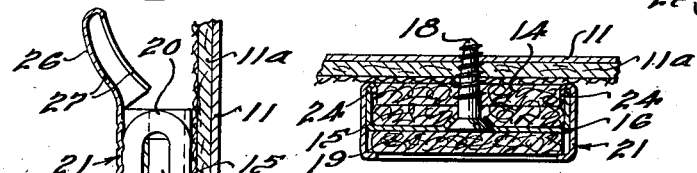
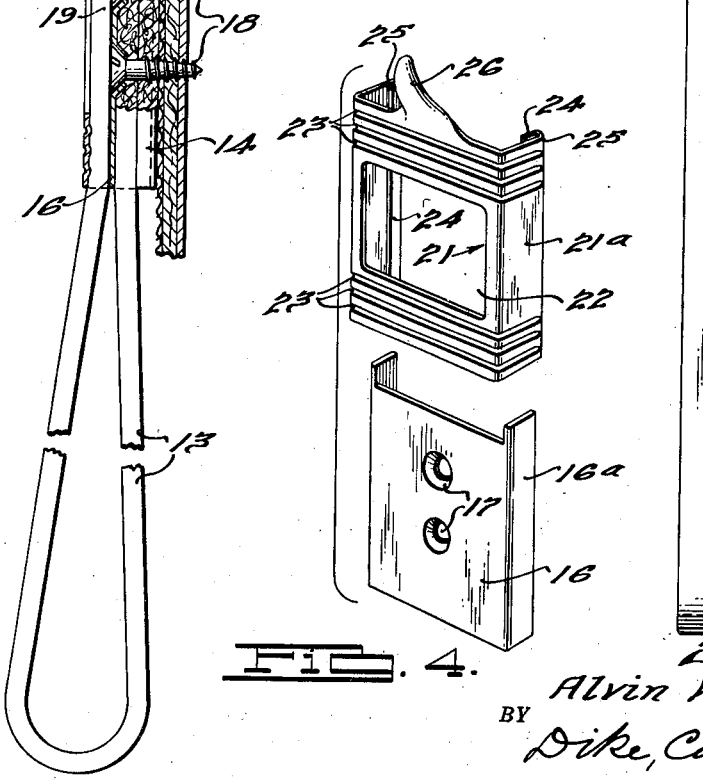
INVENTOR
Alvin W. Prance.
BY
Dike, Calver & Gray
ATTORNEYS.

Patented Oct. 21, 1941

2,260,124

UNITED STATES PATENT OFFICE 2,260,124

ASSIST CORD ASSEMBLY

Alvin W. Prance, Pleasant Ridge, Mich., assignor to Briggs Manufacturing Company, Detroit, Mich., a corporation of Michigan Application May 16, 1938, Serial No. 208,209

8 Claims. (Cl. 105—354)

This invention relates to assist cord assemblies adapted particularly although not exclusively for use in the interior of automobile bodies. In vehicle or automobile body construction it has been customary to provide so-called assist cords or straps upon the interior walls of the automobiles which are useful for the occupant to grasp to assist him in rising or leaving the car, to prevent a fall or to support or brace the occupant against undesirable pitching. Heretofore assist cords or devices of this type have presented various disadvantages, such as in lack of strength, durability, attractiveness in appearance, simplicity in construction and ineffectiveness in properly transmitting strains and pulling forces to the supporting wall.

An object of the present invention is to overcome the foregoing disadvantages and provide an assist cord or strap assembly of compact, sturdy, economical and durable construction ensuring a proper transfer of strains and pulling forces to the vehicle wall while at the same time being attractive and ornamental in appearance.

A further object of the invention is to provide an assist cord assembly simple in construction and having relatively few parts, which parts are capable of easy and quick assembly, and one which can readily be attached to or removed from its supporting surface.

A further object of the present invention is to provide an improved assist cord assembly comprising a flexible strap formed into a depending loop providing a handgrip and in which the upper ends of the strap are arranged in a three-ply formation, retained together and secured to the supporting wall of the vehicle or the like in improved manner.

Other objects of this invention will appear in the following description and appended claims, reference being had to the accompanying drawing forming a part of this specification wherein like reference characters designate corresponding parts in the several views.

Fig. 1 is a fragmentary perspective view of the rear interior of a vehicle body of the enclosed type, embodying one form of the present invention.

Fig. 2 is a central vertical longitudinal section through a side elevation of the same.

Fig. 3 is a plan view in cross section taken on the line 2—2 of Fig. 5 in the direction of the arrows.

Fig. 4 is an exploded perspective view of the outer cover and inner plate assembly, indicating the way in which these parts fit together.

Fig. 5 is a front elevation of the form of the invention depicted in Fig. 1, the concealed portions being inserted in dotted lines.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, one form of assist cord assembly embodying the invention is there shown in one of its applications, namely, as applied to the interior wall of an automobile body. The assembly of the present form of the invention is shown as a whole at 10 (Fig. 1) and is applied to the rear interior panel 11 adjacent a rear door 12. It is to be understood, however, that the location mentioned is but a preferred one and that other suitable and convenient places for mounting the assembly are evident and are contemplated herein.

The assembly, as shown, includes a handgrip member or handhold 13, preferably made from a continuous strip of strong flexible material, such as a length of fabric, heavy cloth, cord, leather or the like, one end portion 14 of which is situated close to or, if desired, against the interior fabric covered trim panel 11a mounted upon the metal supporting panel 11. The other end portion 15 of the handhold 13 lies face to face with the end portion 14 and these ends are enclosed by a pressed metal channel shaped retainer plate 16 which fits against the outer surface of the said end portion 15 and about the longitudinal edges of both end portions. The plate 16 contains a plurality of countersunk openings 17 (Fig. 4) adapted to receive metal screws 18, the heads thereof fitting smoothly into the countersunk portions of the openings 17 as shown in Figs. 2 and 3. The plate 16, as well as the end portions 15 and 14 of the handgrip 13, are removably secured to the panel 11 by the screws 18 which are threaded into the panel 11. It is to be understood, however, that other suitable fastening means serving the purposes of the common fastening elements 18 may be utilized.

The intermediate portion 19 of the handgrip 13 is a continuation of the end portion 14 thereof and extends around the upper end of the plate 16 as well as the upper portion of the end 15 of the handgrip 13 as depicted at 20 (Fig. 2) continuing downwardly over the outer surface of the plate 16 in the manner shown, thereby forming a third and outer layer of the integrally formed handgrip 13. This portion 19 then extends substantially beyond all of the mounting parts of the assembly to form a looped portion especially adapted to be gripped manually as best shown in Fig. 2, particularly at the section thereof designated generally by the numerals 13, 13. Thus it will be observed that the handgrip member is formed from a single strip of material having one upper end bent or folded back upon itself in overlapping engagement with the opposite end to provide a three-ply formation. Such a structure is susceptible of providing for the direct transfer of strains to a supporting surface as well as supplying a firm and secure union of the handgrip to its supporting surface.

A cover or casing 21 is provided which is preferably formed from metal, such as pressed sheet steel or the like, resembling in shape a rectangular box without a bottom. The upper surface of the cover or casing 21 may contain an opening or window 22 and a plurality of grooves 23, 23 for ornamental effect, but any suitable shape or design of the said cover 21 not inconsistent with the functions described hereinafter is contemplated. The cover 21 is preferably chromium plated but any desired ornamental finish, such as lacquering, painting, burnishing, etc., is suitable and may be used. The channel shaped cover 21 has its side flanges 21a provided with inturned portions 24, 24 along its longitudinal edges, which inturning forms grooves 25, 25 between the said portions 24, 24 and the respective side flanges of the cover 21 itself. The grooves 25, 25 are designed to fit over and embrace the longitudinal edges of the side flanges 16a of the retainer plate 16 so that the cover 21 may be slidably imposed or telescoped upon the plate 16 and held in position when slid into place thereupon because the grooves 25, 25 and the side flanges 16a of the plate 16 act as locking grooves and tongues respectively as shown in Fig. 3. However, it will be observed that the cover 21 possesses wider side flanges 21a than the side flanges of the insert member or retainer plate 16 so that a space exists beneath the adjacent outer faces of the members 16 and 21. This interval is occupied by the portion 19 of the handgrip 13 as previously explained, which portion is pressed between the cover 21 and the plate 16 and is thus held in place. The spaced relationship between the cover 21 and the plate 16 is designed to provide for such a gripping effect, this being augmented by the inwardly projecting ribs formed by the grooves 23.

The cover 21 also contains a finger-like projection or hook 26 resultant from a shaping of the metal of the cover 21 in the form of reversely extending substantially horizontal but spaced portions 27 (Fig. 2) the sides of which are curved at least in part in a rounded manner from the outer toward the inner surface and may meet in the rear or leave a slight concealed vertical crack at that point. The projection 26 is, therefore, a gracefully shaped integral portion of the cover 21 extending upwards at a slight forward angle therefrom as depicted in the drawing. The projection 26 not only acts as an ornament, but also as a handle or grip supplemental to the handhold 13. For example, it may readily be employed as a coat hanger.

The assist cord assembly described above may be installed upon a supporting surface, such for example as the rear panel 11, as follows:

The end portion 14 of the handgrip 13 is placed at a selected spot on the panel 11. The plate 16 into which the end portion 15 has previously been inserted is then superimposed thereover. If desired, the plate 16 may be positioned independently, in which event the end portion 15 is first placed upon the portion 14 and held in place while the plate 16 is so positioned. Thereafter, the portion 19 of the handgrip 13 is temporarily held aside while the metal screws 18 are inserted through holes in the portions 14 and 15, into the openings 17 and threaded into preformed holes in the panel 11. The portion 19 is then placed directly upon the outer surface of the plate 16 and the cover 21 is slid into place by inserting the grooves 23 over the edge portions of the plate 16, which portions form tongues fitting thereinto in the manner previously described and as clearly indicated by Fig. 4.

From the foregoing it will be understood that the present invention provides an assist cord assembly which comprises the features of a firmer union with a supporting surface to which pulling forces are effectively transmitted with the elimination of fastening brackets, or the like, thereby greatly lessening damage to the surface and also protecting the same by a layer of cloth-like material. The assembly herein described is of simple construction, is ornamental and is relatively inexpensive to manufacture. It is easy to assemble and disassemble and to apply to and remove from its supporting surface.

I claim:

1. An assist cord assembly comprising an outer casing, an inner retainer member in adjacent relationship, a flexible assist cord having its two ends confined by said retainer member and an extension of one end confined between said member and casing, said extension continuing therebeyond to provide together with an extension of the other end a looped portion of said cord, and a common means concealed by said extension for securing the retainer member and two ends to a support.

2. An assist cord assembly adapted to be removably applied to a supporting surface, comprising a retainer having a channel shaped base and a channel shaped cover, the latter being adapted to be telescoped over the base, the base and cover having web portions spaced to provide a slot when assembled and the web portion of the base being spaced from the supporting surface to provide a channel shaped slot, and a flexible handgrip member having a looped portion depending from the retainer and having its opposite ends overlapped and confined within the channel shaped slot, the inner end adjacent the supporting surface being doubled back through said first named slot and continuing beyond the retainer to form one side of the loop of the handgrip member, while a continuation of the other confined end extends beyond the retainer to form the other side of the said loop.

3. An assist cord assembly comprising a channel shaped base and a channel shaped cover, the latter adapted to be telescoped over the base, the base and cover having web portions spaced to provide a vertical slot and the web portion of the base being spaced from the supporting surface to which it is attached to provide a vertical channel shaped slot, and a looped flexible handgrip member having its opposite ends overlapped and confined within the channel shaped slot, one of said ends being doubled back across the upper edge of the base web and thence extended down through said first named slot to form one side of the handgrip loop portion.

4. An assist cord assembly adapted to be removably applied to a supporting surface comprising a cover, a flexible assist cord, and a supporting plate for said cover, said plate being generally channel shaped the web portion thereof being spaced from said supporting surface to provide a slot and a portion of said cord being secured to said plate in said slot.

5. An assist cord assembly adapted to be removably applied to a supporting surface comprising an outer cover, a flexible assist cord, and a generally channel-shaped mounting and supporting plate over which said cover is slidably fitted, the web portion of said plate being spaced from said supporting surface to provide a slot within which a portion of said cord is secured to said plate.

6. An assist cord assembly comprising a two-piece retainer having a base and a cover carried by said base; and an assist cord having its two ends overlapped and adjacently confined by said retainer, an extension of one end being folded around the upper end of the base and downwardly to conceal said ends and an extension of the other end, said extensions projecting below said retainer and uniting to provide a downwardly hanging looped portion of said cord, the aforesaid ends being adapted to be secured together and to a support.

7. An assist cord assembly comprising a two-piece retainer consisting of a channel-shaped base and a cover carried by said base, a flexible assist cord having its two ends confined by said base in adjacent relationship, said assist cord having an extension of one end folded down to conceal the said ends and the said base, and means concealed by said extension for securing said ends and said base to a support independently of said extension, said base and said cover maintaining said extension in its folded position, the said extension together with an extension of the other end continuing beyond said retainer to form a loop portion of the assist cord depending from the retainer.

8. An assist cord assembly comprising a flexible assist cord consisting of a strip of flat textile material having three upper overlapping portions including the two ends of the strip, said ends being placed in adjacent relationship and an extension of one end being folded back to overlie and conceal the said ends and to form the third of the said overlapping portions, the portion of the strip oppositely disposed from the said overlapping portions forming a depending loop operable as a handgrip; a two-piece retainer for confining said overlapping portions in the aforesaid position, one part thereof clamping said ends together in position for attachment to a supporting surface, and another part thereof being positioned above said clamping part for maintaining said extension in its folded position.

ALVIN W. PRANCE.

CERTIFICATE OF CORRECTION.

Patent No. 2,260,124.  October 21, 1941.

ALVIN W. PRANCE.

It is hereby certified that error appears in the printed specification of the above numbered patent requiring correction as follows: Page 2, second column, lines 38 and 39, claim 1, strike out the words "in adjacent relationship" and insert the same after "member" in line 40, same claim; line 45, before "extension" insert --first named--; and that the said Letters Patent should be read with this correction therein that the same may conform to the record of the case in the Patent Office.

Signed and sealed this 16th day of December, A. D. 1941.

(Seal)

Henry Van Arsdale,
Acting Commissioner of Patents.